S. S. FITCH.
Apparatus for Freezing Liquids.
No. 143,446. Patented Oct. 7, 1873.
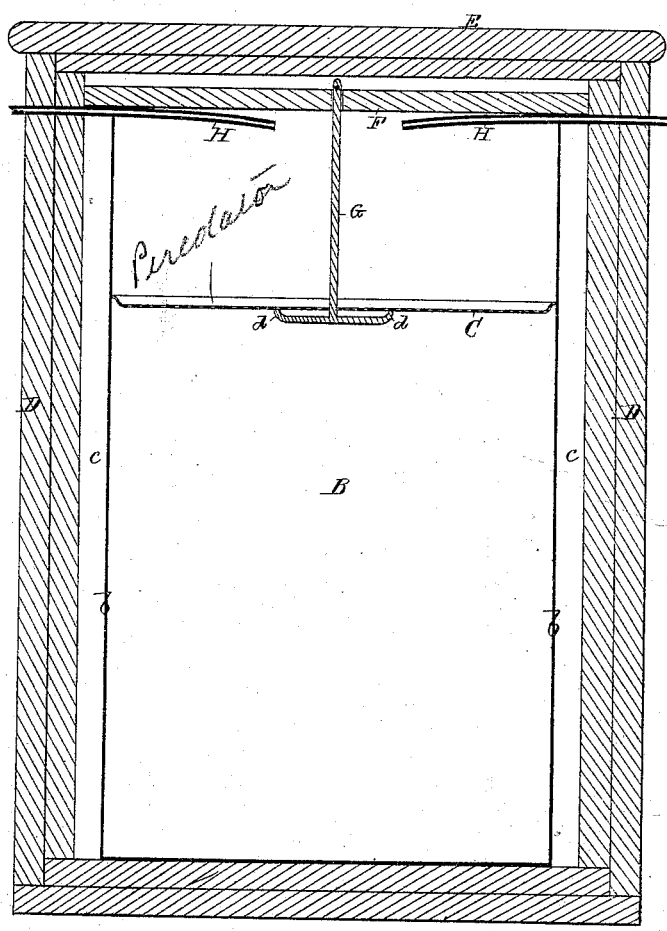
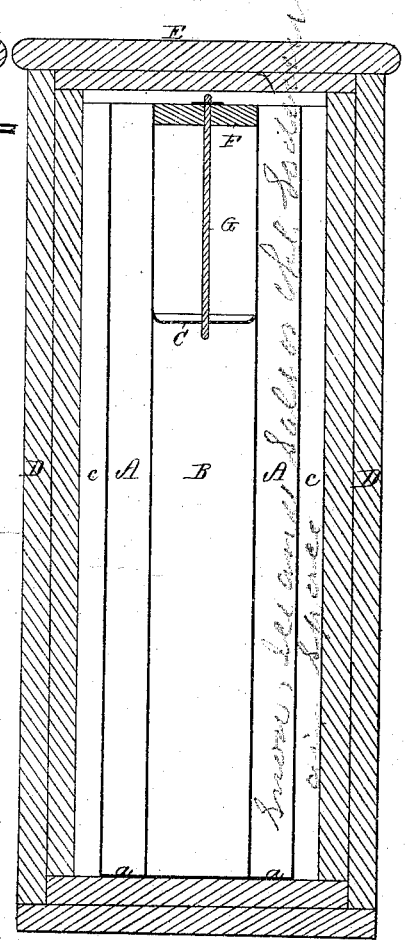
Witnesses
S. U. Piper
L. N. Miller
Samuel S. Fitch.
by his attorney
R. Uhaly

UNITED STATES PATENT OFFICE.

SAMUEL S. FITCH, OF NEW YORK, N. Y.

IMPROVEMENT IN APPARATUS FOR FREEZING LIQUIDS.

Specification forming part of Letters Patent No. 143,446, dated October 7, 1873; application filed August 20, 1873.

*To all whom it may concern:*

Be it known that I, SAMUEL S. FITCH, of the city, county, and State of New York, have invented a new and useful Apparatus for Freezing a Liquid; and I do hereby declare the same to be fully described in the following specification and represented in the accompanying drawings, of which—

Figure 1 is a longitudinal section, and Fig. 2 a transverse section, of it.

In such drawings, A A are two narrow and deep refrigerating-chambers, each being open at top, and composed of sheet metal, and arranged vertically and parallel to each other, at a suitable distance apart. At their bottoms and ends they are connected by metallic plates $a\ b\ b$, in order to form between the two chambers A A a third or much wider chamber, B, designed to receive the liquid to be cooled or frozen. Within the upper part of the middle chamber, and extending across it both lengthwise and widthwise, is a percolator or foraminous plate, C, over which there extend one or more inducts or pipes, H H. The said pipe or pipes are to convey from a reservoir or tank, water or the liquid to be frozen or cooled, and discharge it upon the upper surface of the percolator, through which it is to pass, and from which, in the form of drops or fine spray, it will fall into and down through the chamber B. The refrigerating-chambers A A are designed, when in use, to contain a refrigerating or cooling mixture, such as snow or ice and salt or chloride of sodium, which will so reduce the temperature of the air in the chamber B as to cause it to cool or freeze the fine spray while falling through it.

The devices above described—that is, the refrigerating and receiving chambers A A B, the percolator, and its induct or inducts—are to be arranged within a wooden box, D, provided with a cover, E, the same being so that there may be air spaces or chambers $c\ c\ c\ c$ between the inner surfaces of the box and the outer surfaces of the combined chambers A B A; and, besides such, I usually apply to the chamber B an auxiliary or wooden cover, F, all being as shown. The auxiliary cover F serves to keep the external air from access to the receiving-chamber B and percolator C when the main cover E is raised, in order to admit of access being had to the chambers A A.

Through a hole in the center of the percolator I insert a rod, G, terminating at its lower end in two or more curved prongs, $d\ d$, arranged as shown, such being for the purpose of lifting or stirring up the contents of the chamber B, as occasion may require. Such rod or agitator may be provided with a handle or other suitable means of aiding in putting it in operation.

The apparatus above described is designed for reducing a liquid to a state of fine drops or spray and cooling or freezing it while in such a condition, whereby it is or may be brought into a semi-solid state, or one analogous to that of water converted into snow, or cream frozen and agitated while being frozen.

The apparatus operates with important economic results, as it effects a great saving of labor and attention in comparison to what is usually required in various other kinds of freezers, particularly those provided with rotary agitators.

I make no claim to the principle of dividing water into spray or jet, and subjecting the same to a refrigerating temperature; nor do I claim either of the apparatus therefor, as described in the United States Patents 80,063 and 118,411, my invention being a special construction or new apparatus for such purpose.

In said apparatus I claim as my invention as follows, viz:

1. The percolator or foraminous plate C and the receiving and refrigerating tanks or chambers A B A, arranged as specified.

2. The combination of the percolator C, the chambers A B A, and the encompassing wooden case D, and cover E, with the air-spaces or chambers intervening between such and the combined chambers A B A, all being arranged substantially in manner as specified, the whole being provided with one or more inducts, H, as set forth.

3. The combination of the auxiliary cover F with the percolator C and the chambers A B A, arranged in a wooden box, as specified.

4. The double-hooked rod G, arranged and combined with the percolator C and the chambers or tanks A B A, all being as explained.

SAMUEL S. FITCH.

Witnesses:
W. H. FOSTER,
CAROLINE CHELLIS.